(12) United States Patent
Kim et al.

(10) Patent No.: US 12,160,942 B2
(45) Date of Patent: Dec. 3, 2024

(54) SMART CONVERTER FOR LIGHTING CONTROL DEVICE, SMART CONVERTER HAVING IMPROVED THD AND EMI, AND LIGHTING CONTROL DEVICE INCLUDING SAME

(71) Applicant: LISANTECH CO., LTD, Seoul (KR)

(72) Inventors: Jaekyu Kim, Seoul (KR); Namsun Lee, Seoul (KR)

(73) Assignee: LISANTECH CO., LTD, Seoul (KR)

( * ) Notice: Subject to any disclaimer, the term of this patent is extended or adjusted under 35 U.S.C. 154(b) by 0 days.

(21) Appl. No.: 17/925,280

(22) PCT Filed: Nov. 17, 2021

(86) PCT No.: PCT/KR2021/016922
§ 371 (c)(1),
(2) Date: Nov. 14, 2022

(87) PCT Pub. No.: WO2022/108339
PCT Pub. Date: May 27, 2022

(65) Prior Publication Data
US 2023/0276553 A1 Aug. 31, 2023

(30) Foreign Application Priority Data
Nov. 18, 2020 (KR) .......... 10-2020-0154852

(51) Int. Cl.
*H05B 45/36* (2020.01)
*H05B 45/14* (2020.01)
*H05B 45/37* (2020.01)

(52) U.S. Cl.
CPC ............ *H05B 45/36* (2020.01); *H05B 45/14* (2020.01); *H05B 45/37* (2020.01)

(58) Field of Classification Search
CPC ........ H05B 45/36; H05B 45/14; H05B 45/37; Y02B 20/30
See application file for complete search history.

(56) References Cited

U.S. PATENT DOCUMENTS 7,378,805 B2 * 5/2008 Oh ..................... H05B 45/3725
315/307

FOREIGN PATENT DOCUMENTS

JP 2004-327152 A 11/2004
KR 10-2011-0139553 A 12/2011
(Continued)

OTHER PUBLICATIONS

Korean Office Action dated Jan. 27, 2021 as received in application No. 10-2020-0154852.
(Continued)

*Primary Examiner* — Metasebia T Retebo
(74) *Attorney, Agent, or Firm* — Maschoff Brennan

(57) ABSTRACT

A converter for a lighting control device for controlling lighting comprises: a filter circuit configured to remove a noise component included in an input power; a full-wave rectifier circuit configured to generate a full-wave rectified power from an input power from which a noise component has been removed; a power conversion circuit configured to generate a driving power of lighting by using a full-wave rectified power; and a dimming control circuit configured to output a dimming control signal for adjusting a driving power to the power conversion circuit, according to a dimming level indicating brightness of lighting, wherein the dimming control circuit outputs a first control signal to the full-wave rectifier circuit when the dimming level is less than a first reference value, and in response to the first
(Continued)

control signal, the combined capacitance of the full-wave rectifier circuit is reduced, so that total harmonic distortion (THD) is reduced.

12 Claims, 7 Drawing Sheets

(56) References Cited

FOREIGN PATENT DOCUMENTS

| KR | 20110139553 A | * | 12/2011 |
|---|---|---|---|
| KR | 10-1365924 B | | 2/2014 |
| KR | 10-2014-0065228 A | | 5/2014 |
| KR | 10-1448655 B | | 10/2014 |
| KR | 10-2016-0144239 A | | 12/2016 |
| KR | 10-2260710 B | | 6/2021 |
| WO | 2016/182205 A2 | | 4/2016 |
| WO | 2022/108339 A1 | | 5/2022 |

OTHER PUBLICATIONS

Korean Office Action dated Jun. 29, 2021 as received in application No. 10-2021-0023896.
Korean Office Action dated Jun. 29, 2021 as received in application No. 10-2021-0023897.
Korean Office Action dated Jun. 29, 2021 as received in application No. 10-2021-0023898.

* cited by examiner

[FIG. 1]
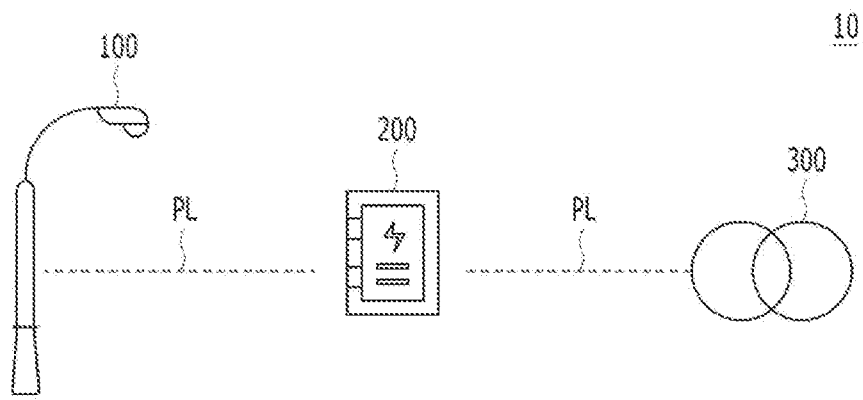
[FIG. 2]
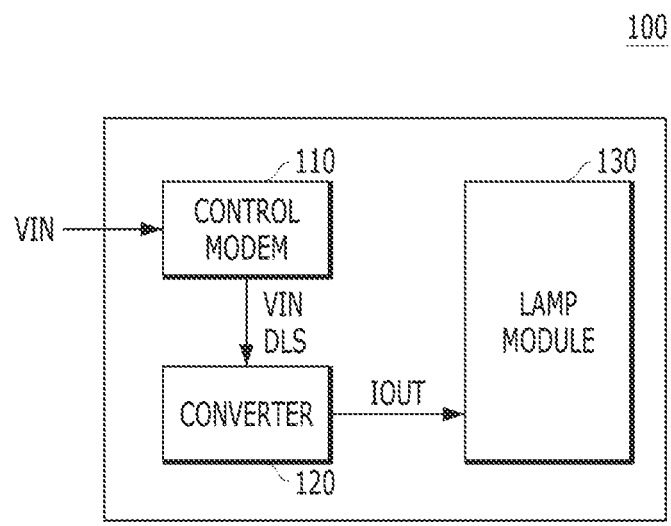

[FIG. 3]
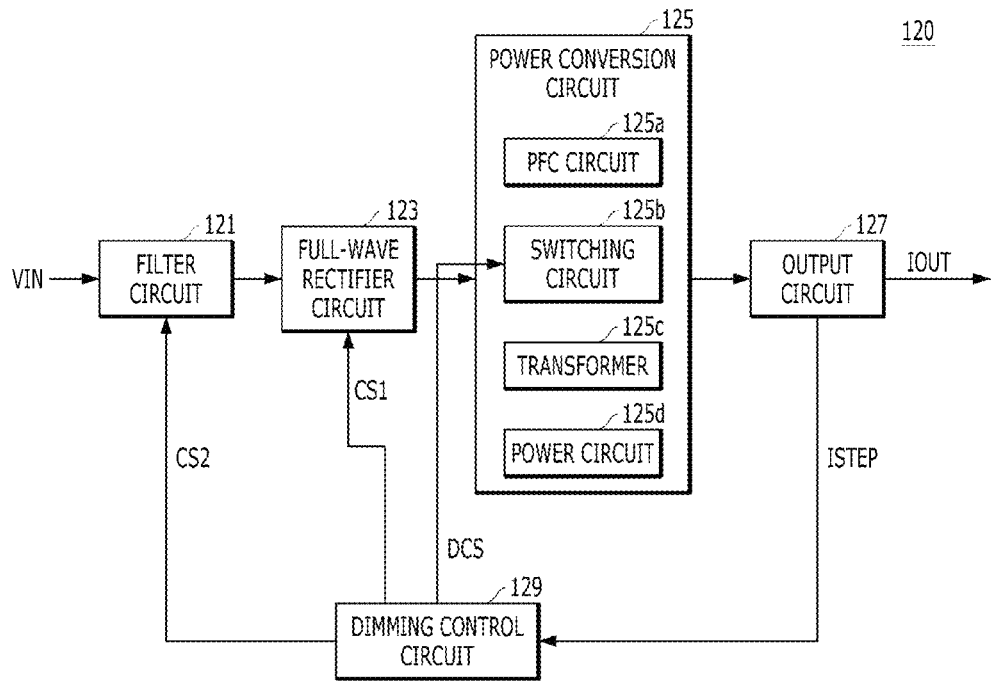
[FIG. 4]
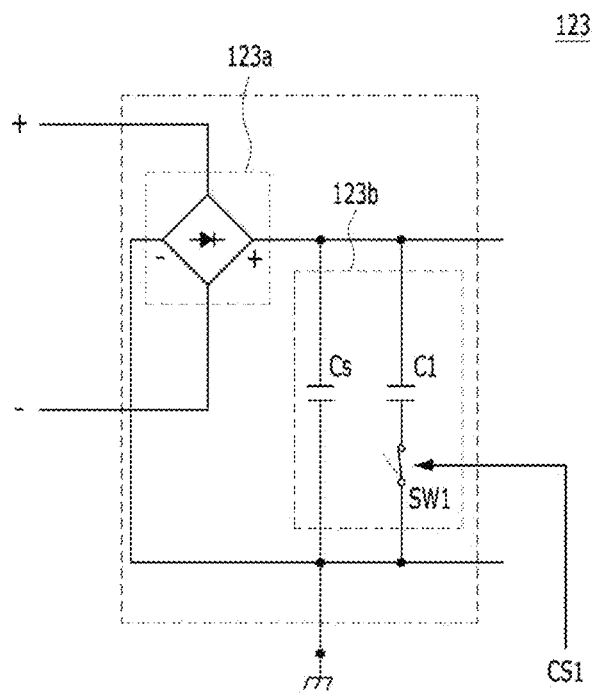

[FIG. 5]
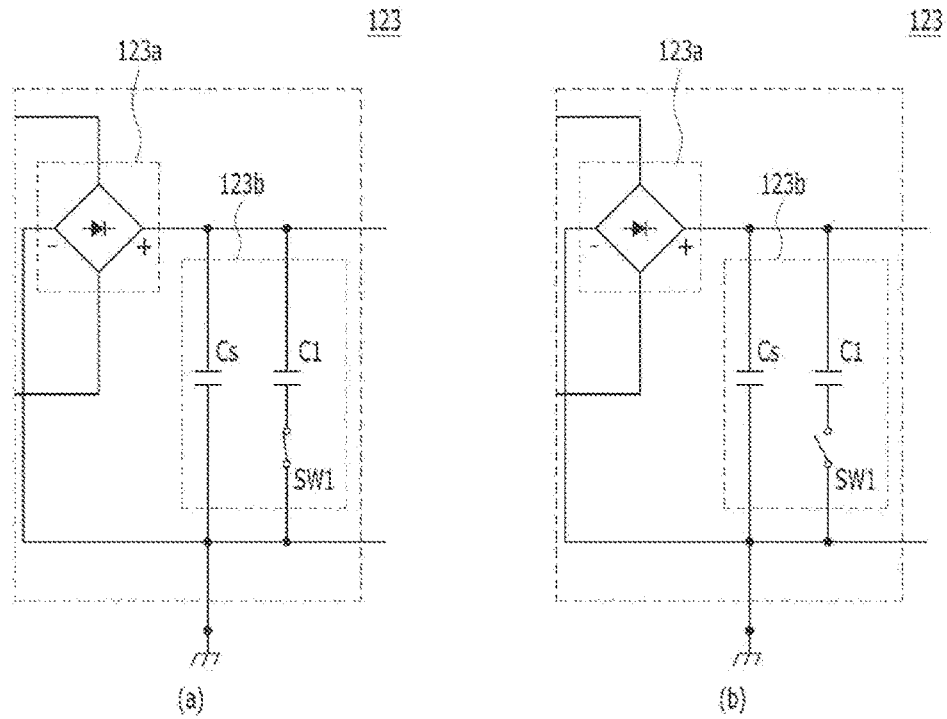
[FIG. 6]
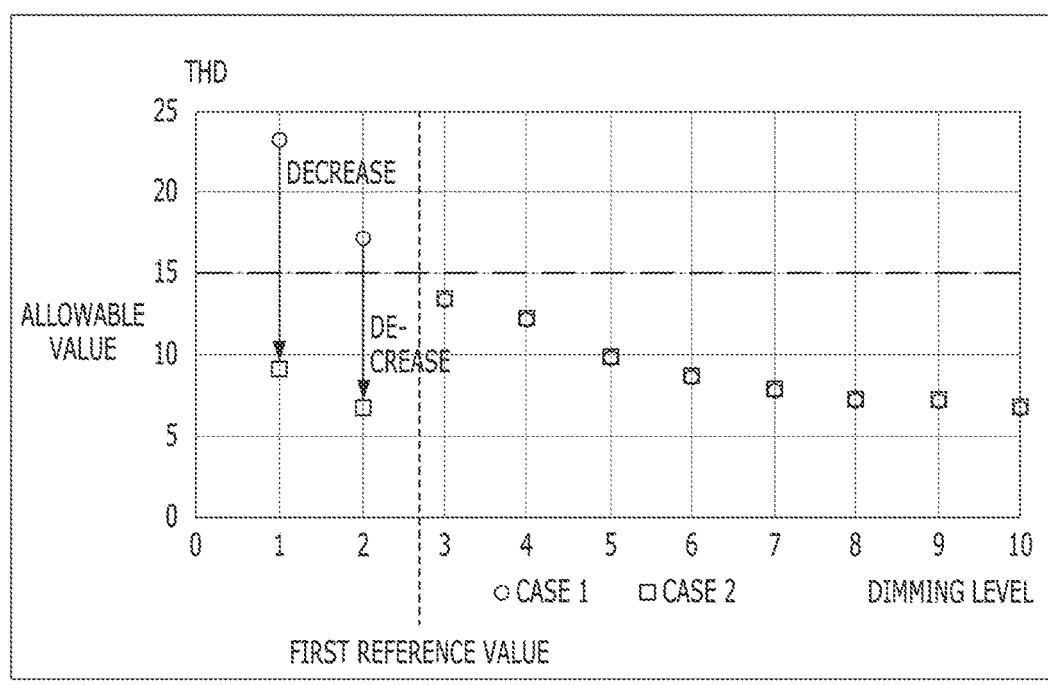

[FIG. 7]
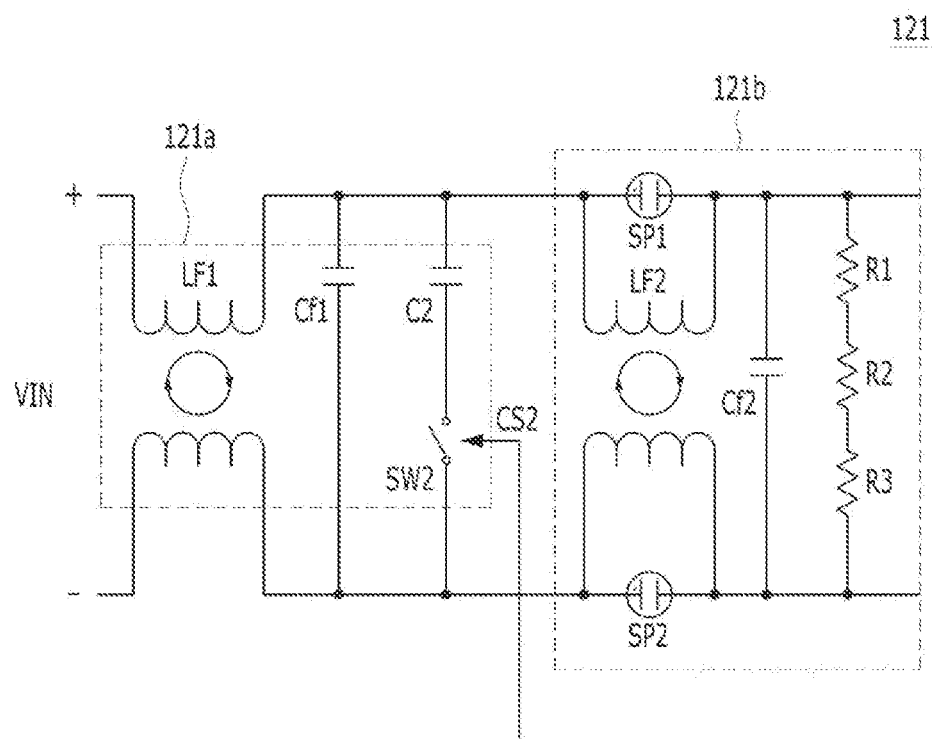

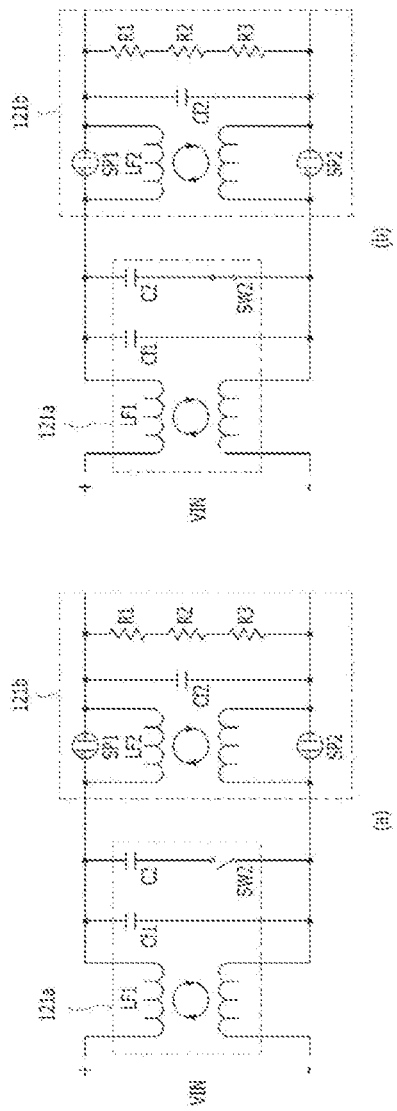
[FIG. 8]

[FIG. 9]
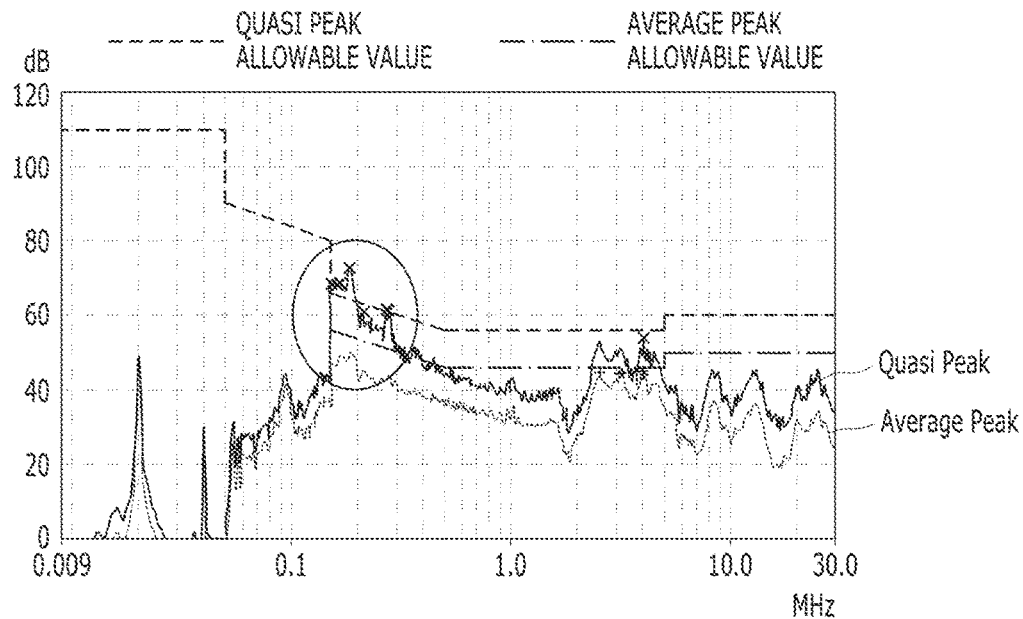
[FIG. 10]
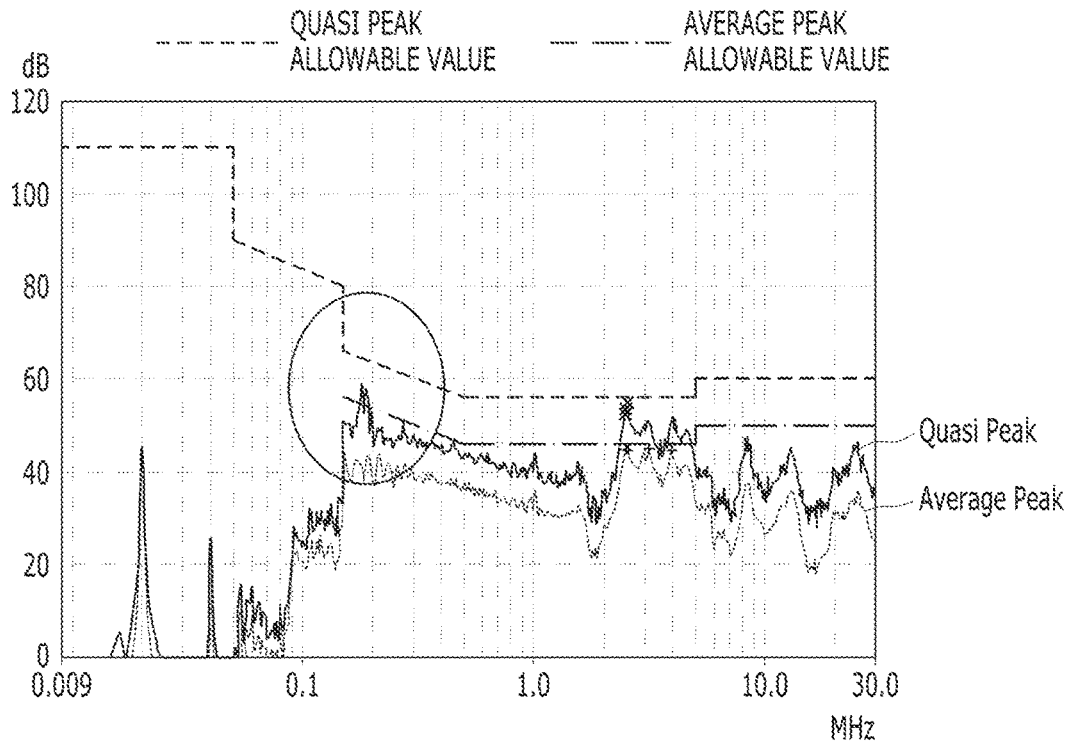

[FIG. 11]
[FIG. 12]
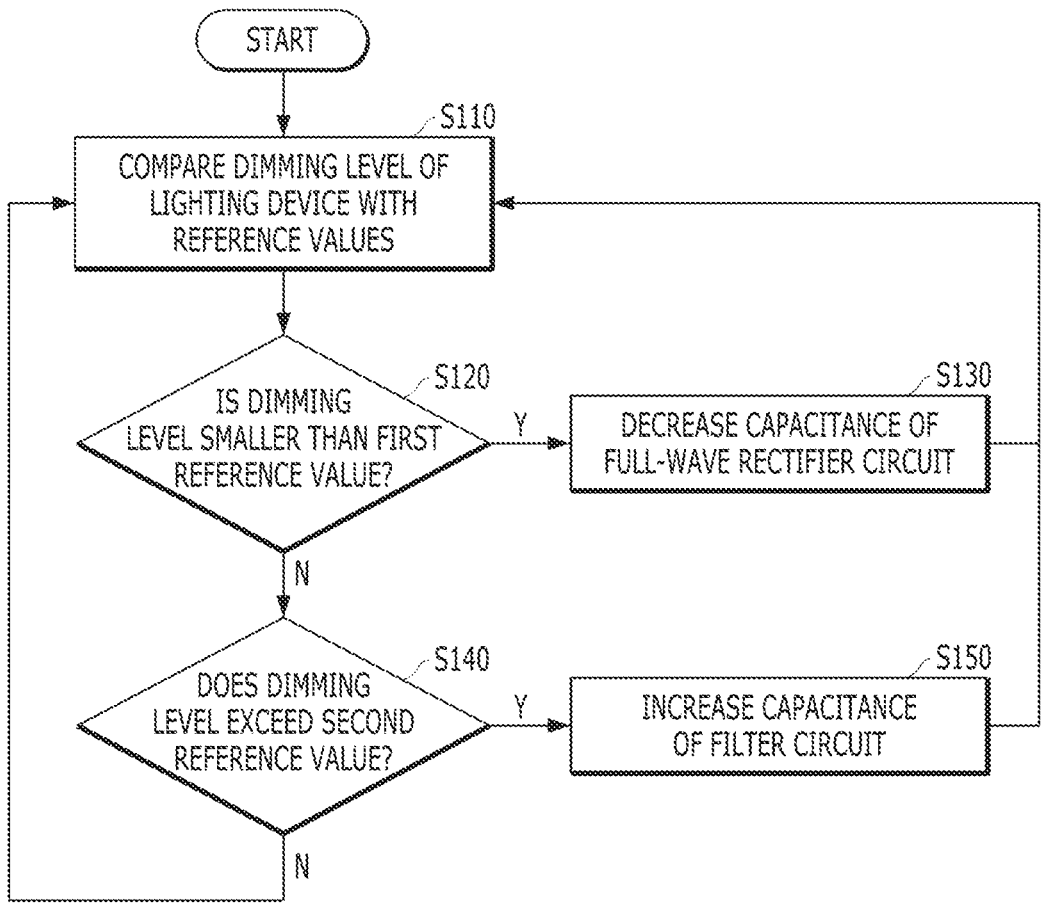

SMART CONVERTER FOR LIGHTING CONTROL DEVICE, SMART CONVERTER HAVING IMPROVED THD AND EMI, AND LIGHTING CONTROL DEVICE INCLUDING SAME

TECHNICAL FIELD

The present disclosure relates to a converter and a lighting control device including the same, and particularly, to a smart converter for a lighting control device having improved total harmonic distortion (THD) and electromagnetic interference (EMI) and the lighting control device including the same.

BACKGROUND ART

Lightings are devices for emitting light using electricity and include a light emitting element for emitting light. In order for the light emitting element to emit light, power corresponding to rated power of the light emitting element needs to be supplied thereto. In general, since commercial power and the rated power have different specifications, the commercial power needs to be converted into the rated power of the light emitting element. Therefore, the lightings include a converter for the lighting control device configured to convert the commercial power into the rated power.

A power conversion device, such as a converter, may generate harmonics due to operational characteristics. Since the harmonics may be a factor of decreasing the performance of the converter and increasing energy consumption and may cause a failure of external electronic devices, it is necessary to manage the harmonics with appropriate criteria. There is total harmonic distortion (THD) as an indicator for identifying a degree of generation of harmonics in the converter. The THD of the converter is regulated by a domestic standard (KS-Korea Standard). In addition, the power conversion device such as a converter may generate electromagnetic interference (EMI), which may also cause malfunctions of the converter and external electronic devices. The EMI generated from the converter includes radiated EMI and conducted EMI. EMI standards for converters are legally prescribed by the Radio Act. The standard is an EMI standard for electronic devices, and the standard is applied to the converters.

Meanwhile, the THD and EMI standards for the converters are prepared based on the rated power. When the brightness control (i.e., dimming) of the lighting is possible, it is necessary to prepare THD and EMI standards for each dimming level, and the converters also need to meet the THD and EMI standards according to the dimming level.

SUMMARY OF INVENTION

Technical Problem

The present disclosure is directed to providing a converter for a lighting control device, which may change a combined capacitance of the converter for the lighting control device according to a dimming level of the converter for the lighting control device and the lighting control device including the same.

The present disclosure is directed to providing a converter for a lighting control device, which may improve total harmonic distortion (THD) and electromagnetic interference (EMI) of the converter of the lighting control device by changing a combined capacitance of the converter for the lighting control device according to a dimming level of the converter for the lighting control device.

Solution to Problem

A converter for the lighting control device for controlling lighting according to embodiments of the present disclosure includes a filter circuit configured to remove a noise component included in input power, a full-wave rectifier circuit configured to generate a full-wave rectified power from the input power with the noise component removed, a power conversion circuit configured to generate driving power of the lighting using the rectified power, and a dimming control circuit configured to output a dimming control signal for adjusting the driving power to the power conversion circuit according to a dimming level indicating a brightness of the lighting, wherein the dimming control circuit outputs a first control signal to the full-wave rectifier circuit when the dimming level is smaller than a first reference value, and a combined capacitance of the full-wave rectifier circuit is reduced in response to the first control signal, thereby reducing total harmonic distortion (THD) of the converter for the lighting control device.

A lighting control device included in a lighting and configured to control the lighting according to embodiments of the present disclosure includes a control modem configured to receive alternating current (AC)-typed input power from an external controller and a converter for a lighting control device configured to generate a direct current (DC)-typed driving power using the AC-typed input power, wherein the control modem outputs a dimming level signal representing a dimming level associated with a brightness of the lighting to the converter for the lighting control device, and the converter for the lighting control device adjusts a magnitude of the driving power based on the dimming level signal, changes a combined capacitance of the converter for the lighting control device to a first capacitance when the dimming level is smaller than a first reference value, changes the combined capacitance of the converter for the lighting control device to a second capacitance greater than the first capacitance when the dimming level is greater than or equal to the first reference value, and changes the combined capacitance of the converter for the lighting control device to a third capacitance greater than the second capacitance when the dimming level exceeds a second reference value greater than the first reference value.

Advantageous Effects of Invention

The converter for the lighting control device according to the embodiments of the present disclosure can change the capacitance according to the dimming level of the lighting, thereby improving the THD and EMI of the converter for the lighting control device.

In addition, although there are currently only the standards for the THD and EMI for the rated power of the lighting, the converter for the lighting control device according to the embodiments of the present disclosure can change the capacitance according to the dimming level signal of the lighting, thereby meeting the standards for the THD and EMI for each dimming level as well as the rated power.

BRIEF DESCRIPTION OF DRAWINGS

FIG. 1 shows a lighting system according to embodiments of the present disclosure.

FIG. 2 shows a lighting according to the embodiments of the present disclosure.

FIG. 3 shows a converter for a lighting control device according to the embodiments of the present disclosure.

FIG. 4 shows a full-wave rectifier circuit according to the embodiments of the present disclosure.

FIG. 5 shows an operation of the full-wave rectifier circuit according to the embodiments of the present disclosure.

FIG. 6 is a view showing an effect of improving total harmonic distortion (THD) according to an operation of the full-wave rectifier circuit according to the embodiments of the present disclosure.

FIG. 7 shows a filter circuit according to the embodiments of the present disclosure.

FIG. 8 shows an operation of the filter circuit according to the embodiments of the present disclosure.

FIGS. 9 and 10 are views showing an effect of improving electromagnetic interference (EMI) according to the operation of the filter circuit according to the embodiments of the present disclosure.

FIG. 11 shows an operation of the converter for the lighting control device according to the embodiments of the present disclosure.

FIG. 12 is a flowchart showing a method of operating the converter for the lighting control device according to the embodiments of the present disclosure.

DESCRIPTION OF EMBODIMENTS

In order to clearly describe the present disclosure, portions irrelevant to the description are omitted, and the same reference numerals are given the same or similar components throughout the specification.

Although not defined otherwise, all terms including technical and scientific terms used herein have the same meaning as commonly understood by those skilled in the art to which the present disclosure pertains. Commonly used terms defined in the dictionary are additionally interpreted as having a meaning consistent with the related technical literature and the presently disclosed content, and unless defined, are not interpreted in an ideal or very formal meaning.

Hereinafter, embodiments of the present disclosure will be described in detail with reference to the accompanying drawings so that those skilled in the art may easily carry out the embodiments. However, the present disclosure may be implemented in several different forms and is not limited to the embodiments described herein.

FIG. 1 shows a lighting system according to embodiments of the present disclosure. Referring to FIG. 1, a lighting system 10 may include a lighting 100, a lighting controller 200, and a power supply 300.

The lighting 100 may be a device configured to emit light using electricity. For example, the lighting 100 may be a lighting fixture, such as a street lamp or a tunnel lamp including a light emitting element, but embodiments of the present disclosure are not limited thereto. In addition, for example, the lighting 100 may be a light emitting diode (LED) lighting fixture including an LED element, but the embodiments of the present disclosure are not limited thereto.

The lighting 100 may be connected to the lighting controller 200 through a power line PL and may emit light based on a voltage transmitted from the lighting controller 200. According to the embodiments, the lighting 100 may be connected to the lighting controller 200 through the power line PL and may receive an operating voltage (e.g., alternating current (AC) voltage) through the power line PL.

The lighting 100 may have different brightness over time. In other words, the lighting 100 may perform brightness control (i.e., dimming) According to the embodiments, the lighting 100 may perform dimming according to control from the lighting controller 200 or perform the dimming based on information stored in the lighting 100 (e.g., without control from the outside).

The lighting controller 200 may be configured to control the lighting 100. According to the embodiments, the lighting controller 200 may be connected to the power supply 300 and the lighting 100 to transmit power (e.g., commercial power) transmitted from the power supply 300 to the lighting 100. For example, the power source is a commercial power source and may be an AC voltage having a frequency of 60 Hz and an amplitude of 220 V.

For example, the lighting controller 200 may be a panel board for controlling the lighting 100, but the embodiments of the present disclosure are not limited thereto.

The power supply 300 supplies power, which is electrical energy, and may supply power through the power line PL. According to the embodiments, the power supply 300 may be a power plant, a substation, or a transformer, but the embodiments of the present disclosure are not limited thereto.

FIG. 2 shows the lighting according to the embodiments of the present disclosure. Referring to FIG. 2, the lighting 100 may include a control modem 110, a converter 120 for the lighting control device, and a lamp module 130.

The control modem 110 may operate based on input power VIN. According to the embodiments, the control modem 110 may receive the input power VIN of the AC waveform, generate operating power of a direct current (DC) waveform from the received input power VIN of the AC waveform, and operate based on the operating power. For example, the control modem 110 may include an AC/DC converter configured to receive the input power VIN of the AC waveform through the power line PL and generate the operating power of the DC waveform from the input power VIN of the AC waveform.

The control modem 110 may output the received input power VIN to the converter 120 for the lighting control device. According to the embodiments, the control modem 110 may include a bypass circuit and output the input power VIN received from the lighting controller 200 through the bypass circuit to the converter 120 for the lighting control device.

According to the embodiments, the control modem 110 may exchange data with the lighting controller 200. For example, the control modem 110 may perform power line communication with the lighting controller 200 through the power line PL and operate using data transmitted through the power line PL. For example, the control modem 110 may receive control data for controlling the dimming of the lighting 100 from the lighting controller 200 through the power line PL.

The converter 120 for the lighting control device may output driving power IOUT for driving the lamp module 130. According to the embodiments, the converter 120 for the lighting control device may generate the driving power IOUT based on the input power VIN and output the generated driving power IOUT to the lamp module 130. For example, the input power VIN may be an AC voltage, and the driving power IOUT may be a DC current. In other words, the converter 120 for the lighting control device may convert the input power VIN into the driving power IOUT for operating (i.e., emitting light from) the lamp module 130 and output the driving power IOUT to the lamp module 130.

The lamp module 130 may emit light based on the supplied driving power IOUT. According to the embodiments, the lamp module 130 may be an LED lamp, a halogen lamp, or a sodium lamp including LED elements, but the embodiments of the present disclosure are not limited to the type of the lamp module.

The lighting 100 according to the embodiments of the present disclosure may perform dimming Therefore, the brightness of the lighting 100 may vary over time.

The brightness of the lighting 100 may be based on the brightness of the lamp module 130 which is a light source, and the brightness of the lamp module 130 may be based on an intensity of the operating power IOUT output from the converter 120 for the lighting control device. According to the embodiments, the converter 120 for the lighting control device may adjust the intensity of the operating power IOUT to control the dimming of the lighting 100. For example, the converter 120 for the lighting control device may adjust the intensity of the driving power IOUT in a range from a minimum level to a maximum level.

The control modem 110 may output a dimming level signal DLS for controlling the dimming (i.e., brightness adjustment) of the lighting 100. According to the embodiments, the control modem 110 may output the dimming level signal DLS associated with the dimming level indicating a brightness degree of the lighting 100 to the converter 120 for the lighting control device, and the converter 120 for the lighting control device may adjust a magnitude (or intensity) of the driving power IOUT to be output to the lamp module 130 based on the dimming level signal DLS.

In this case, the dimming level signal DLS may be a voltage having a level in a specific range. For example, the dimming level signal DLS may be a voltage having a value between 0 V and 10 V or a pulse width modulation (PWM) signal, but the embodiments of the present disclosure are not limited thereto.

In other words, the magnitude of the driving power IOUT output from the converter 120 for the lighting control device may vary according to the dimming level signal DLS output from the control modem 110.

According to the embodiments, the converter 120 for the lighting control device may receive the dimming level signal DLS output from the control modem 110 and adjust the intensity of the operating power IOUT from the range from the minimum level to the maximum level based on the dimming level signal (DLS), and as a result, the brightness of the lighting 100 may be adjusted in the range from the minimum level to the maximum level.

FIG. 3 shows a converter according to the embodiments of the present disclosure. Referring to FIG. 3, the converter 120 for the lighting control device may include a filter circuit 121, a full-wave rectifier circuit 123, a power conversion circuit 125, and a dimming control circuit 129.

The filter circuit 121 may receive the input power VIN. The filter circuit 121 may remove a noise component included in the input power VIN. In other words, the filter circuit 121 may remove electromagnetic interference (EMI) noise included in the input power VIN.

According to the embodiments, the filter circuit 121 may remove conductive noise and radiative noise included in the input power VIN and output the input power with the noises removed.

According to the embodiments of the present disclosure, a combined capacitance of the filter circuit 121 may be changed according to the control of the dimming control circuit 129. Therefore, it is possible to improve the EMI performance of the filter circuit 121. This will be described below.

According to the embodiments, a voltage stabilization circuit may be additionally provided at a front end of the filter circuit 121, and the filter circuit 121 may receive the input power VIN having passed through the voltage stabilization circuit.

The voltage stabilization circuit may be configured to protect the converter 120 for the lighting control device by blocking an overcurrent or an overvoltage when the overcurrent or the overvoltage is input as the input power VIN. For example, the voltage stabilization circuit may include a fuse for blocking the input overcurrent and a varistor for blocking the input overvoltage, but the embodiments of the present disclosure are not limited thereto.

The full-wave rectifier circuit 123 may convert the input power VIN with the noises transmitted from the filter circuit 121 removed into DC power. According to the embodiments, the full-wave rectifier circuit 123 may output the full-wave rectified power by rectifying and smoothing the input power VIN with the noises removed. For example, the full-wave rectifier circuit 123 may output the DC power by rectifying and smoothing the input power VIN with the AC-typed noises removed.

The power conversion circuit 125 may receive the DC power and output the driving power IOUT using the DC power. According to the embodiments, the power conversion circuit 125 may output the driving power IOUT to the lamp module 130 by improving a power factor of the DC power and transforming the DC voltage having the improved power factor.

The power conversion circuit 125 may include a power factor correction (PFC) circuit 125a, a switching circuit 125b, a transformer 125c, and a power circuit 125d.

The PFC circuit 125a may improve the power factor of the input power. According to the embodiments, the PFC circuit 125a can improve the power factor of the input power by reducing a difference between phases of a voltage and a current. For example, the PFC circuit 125a can improve the power factor of the input power by allowing the phases of the voltage and the current to be in phase with each other. For example, the PFC circuit 125a can improve the power factor of the input power by changing the magnitude of the DC power.

According to the embodiments, the PFC circuit 125a may include a plurality of elements and integrated circuits.

The switching circuit 125b may be connected between the PFC circuit 125a and the transformer 125c and may control the transmission of the DC power from the PFC circuit 125a to the transformer 125c. According to the embodiments, the switching circuit 125b may convert the DC power transmitted from the PFC circuit 125a into pulse power through a switching operation and transmit the converted pulse power to the transformer 125c.

The switching circuit 125b may adjust a width of the pulse power and adjust the magnitude of the output power output from the transformer 125c by adjusting the width of the pulse power. In other words, the switching circuit 125b may control the output of the output power of the transformer 125c by controlling the switching of the transformer 125c.

For example, the switching circuit 125b may include a switching element, such as a transistor, and an integrated circuit.

The transformer 125c may transform the pulse power output from the switching circuit 125b and output the transformed pulse power as an output power. According to the embodiments, the transformer 125c may include a first inductor and a second inductor coupled to the first inductor, the pulse power may be applied to the first inductor, and the transformed output power may be applied to the second inductor.

The power circuit 125d may supply power required for operating the PFC circuit 125a and the switching circuit 125b. According to the embodiments, the power circuit 125d may supply the DC power required for operating the PFC circuit 125a and the switching circuit 125b. For example, the power circuit 125d may supply power to the integrated circuits included in each of the PFC circuit 125a and the switching circuit 125b.

The output circuit 127 may generate the driving power IOUT using the output power output from the transformer 125c. According to the embodiments, the output circuit 127 may convert the output power output from the transformer 125c into the DC power and output the driving power IOUT. For example, the driving power IOUT may be a DC voltage or a DC current.

According to the embodiments, the output circuit 127 may include a plurality of diodes and a capacitor, the plurality of diodes may rectify and output the output power, and the rectified output power may be smoothed by passing through the capacitor. According to the embodiments, the output circuit 127 may further include a line filter including an inductor.

The output circuit 127 may output the driving power IOUT to the lamp module 130. According to the embodiments, the output circuit 127 may further include a detection circuit configured to detect the magnitude of the driving power IOUT output from the output circuit 127, and the detection circuit may detect the magnitude of the output driving power IOUT and output a detected result ISTEP to the dimming control circuit 129. According to the embodiments, the detected result ISTEP may be a signal indicating the magnitude of the driving power IOUT. For example, the magnitude of the detected result ISTEP may be the same as the magnitude of the driving power IOUT, but the embodiments of the present disclosure are not limited thereto.

The dimming control circuit 129 may control the filter circuit 121, the full-wave rectifier circuit 123, and the power conversion circuit 125.

The dimming control circuit 129 may output the dimming control signal DCS for controlling the brightness of the lighting 100 to the power conversion circuit 125. According to the embodiments, the dimming control circuit 129 may output the dimming control signal DCS for controlling the brightness of the lighting 100 to the power conversion circuit 125 based on the intensity of the output of the output circuit 127.

For example, the dimming control signal DCS output from the dimming control circuit 129 may be transmitted to the switching circuit 125b of the power conversion circuit 125, and the switching circuit 125b may adjust the intensity of the driving current IOUT by adjusting the width of the pulse power transmitted to the transformer 125c according to the dimming control signal DCS, and as a result, the brightness of the lighting 100 may be adjusted.

For example, the dimming control circuit 129 may include a photo coupler and output the dimming control signal DCS to the switching circuit 125b by controlling the photo coupler, but the embodiments of the present disclosure are not limited thereto.

The dimming control circuit 129 according to the embodiments of the present disclosure may control the converter 120 for the lighting control device so that the combined capacitance of the converter 120 for the lighting control device is changed according to the dimming level of the lighting 100.

According to the embodiments, the dimming control circuit 129 may control the converter 120 for the lighting control device so that the combined capacitance of the converter 120 for the lighting control device is changed to a first capacitance when the dimming level of the lighting 100 is smaller than a first reference value, the combined capacitance of the converter 120 for the lighting control device is changed to a second capacitance greater than the first capacitance when the dimming level is greater than or equal to the first reference value, and the combined capacitance of the converter 120 for the lighting control device is changed to a third capacitance greater than the second capacitance when the dimming level exceeds the second reference value greater than the first reference value.

The dimming control circuit 129 may output control signals CS1 and CS2 for changing the combined capacitance of the converter 120 for the lighting control device according to the dimming level of the lighting 100.

According to the embodiments, the dimming control circuit 129 may output the first control signal CS1 for changing the combined capacitance of the full-wave rectifier circuit 123 and the second control signal CS2 for changing the combined capacitance of the filter circuit 121. For example, the dimming control circuit 129 may output the first control signal CS1 instructing a decrease in the combined capacitance of the full-wave rectifier circuit 123 and output the second control signal CS2 instructing an increase in the combined capacitance of the filter circuit 121.

The dimming control circuit 129 may output the control signals CS1 and CS2 according to the magnitude of the dimming level signal DLS or the detected result ISTEP associated with the dimming level of the lighting 100.

For example, the dimming control circuit 129 includes an integrated circuit having an arithmetic processing function, wherein the integrated circuit may compare the dimming level of the lighting 100 with the first reference value previously stored and output the first control signal CS1 according to the comparison result. In addition, the integrated circuit may compare the dimming level of the lighting 100 with the second reference value previously stored and output the second control signal CS2 according to the comparison result. In this case, the first reference value may be smaller than the second reference value.

According to the embodiments, the converter 120 for the lighting control device includes the photo coupler, and the control signals CS1 and CS2 may be transmitted from the dimming control circuit 129 to the full-wave rectifier circuit 123 and the filter circuit 121 through the photo coupler.

For example, the dimming control circuit 129 may include a first light emitting element and a second light emitting element, output the first control signal CS1 in the form of an optical signal by controlling the first light emitting element, and output the second control signal CS2 by controlling the second light emitting element. In this case, the full-wave rectifier circuit 123 may include a first light receiving element, and the first light receiving element may operate in response to the first control signal CS1 in the form of the optical signal output from the first light emitting element. In addition, the filter circuit 121 may include a second light receiving element, and the second light receiving element may operate in response to the second control signal CS2 in the form of the optical signal output from the second light emitting element.

Meanwhile, the embodiments of the present disclosure are not limited to the output method of the control signals CS1 and CS2.

FIG. 4 shows the full-wave rectifier circuit according to the embodiments of the present disclosure. Referring to FIG. 4, the full-wave rectifier circuit 123 may include a rectifying circuit 123a and a smoothing circuit 123b.

When the combined capacitance of the full-wave rectifier circuit 123 is reduced, it is possible to reduce (i.e., improve) the THD of the converter 120 for the lighting control device. As will be described below, the converter 120 for the lighting control device according to the embodiments of the present disclosure may change the combined capacitance of the full-wave rectifier circuit 123 according to the dimming level of the lighting 100 and thus, it is possible to improve the THD of the converter 120 for the lighting control device according to the dimming level.

The rectifying circuit 123a may rectify the input power VIN with the noises output from the filter circuit 121 removed. According to the embodiments, the rectifying circuit 123a may output ripple power by rectifying the input power VIN with the noises removed according to a full-wave rectification or half-wave rectification method. For example, the rectifying circuit 123a may include a diode bridge circuit, but the embodiments of the present disclosure are not limited thereto.

The smoothing circuit 123b may output full-wave rectified power by smoothing the ripple power output from the rectifying circuit 123a. According to the embodiments, the smoothing circuit 123b may include at least one smoothing capacitor Cs.

The combined capacitance of the full-wave rectifier circuit 123 according to the embodiments of the present disclosure may be reduced in response to the first control signal CS1. According to the embodiments, the combined capacitance of the smoothing circuit 123b may be reduced in response to the first control signal CS1.

According to the embodiments, the smoothing circuit 123b may include a plurality of capacitors arranged in a first array, and the array of the plurality of capacitors may be changed from the first array to a second array in response to the first control signal CS1. In this case, a capacitance in the second array of the smoothing circuit 123b may be smaller than a capacitance in the first array.

For example, the smoothing circuit 123b may include a first capacitor C1 selectively connected in parallel to the smoothing capacitor Cs in response to the first control signal CS1 and a first switch SW1 connected to the first capacitor C1 and operating in response to the first control signal CS1. As the first switch SW1 is turned on and turned off, it may be determined whether the smoothing capacitor Cs and the first capacitor C1 are connected in parallel, and thus the combined capacitance of the smoothing circuit 123b may be changed. For example, the smoothing capacitor Cs and the first capacitor C1 may be disposed between the rectifying circuit 123a and the PFC circuit 125a.

For example, as shown in FIG. 4, one end of the smoothing capacitor Cs may be connected to one end of the first capacitor C1, the other end of the smoothing capacitor Cs may be connected to one end of the first switch SW1, and the other end of the first capacitor C1 may be connected to the other end of the first switch SW1. At this time, when the first switch SW1 is turned off in response to the first control signal CS1, the first capacitor C1 connected in parallel may be cut from the smoothing capacitor Cs, and thus the combined capacitance of the smoothing circuit 123b is reduced.

In the specification, the embodiment in which the smoothing circuit 123b further includes the first capacitor C1 connected in parallel to the smoothing capacitor Cs in response to the first control signal CS1 is described, but according to the embodiments, the smoothing capacitor Cs may also be implemented as a variable capacitor whose capacitance is changed in response to the first control signal CS1.

According to the embodiments, the first control signal CS1 may be output based on the dimming level of the lighting 100. For example, the first control signal CS1 may be output when the dimming level of the lighting 100 is smaller than the first reference value.

FIG. 5 shows an operation of the full-wave rectifier circuit according to the embodiments of the present disclosure. FIG. 5A shows the full-wave rectifier circuit 123 in which the first switch SW1 is turned on, and FIG. 5B shows the full-wave rectifier circuit 123 in which the first switch SW1 is turned off.

The dimming control circuit 129 may compare the magnitude of the dimming level signal DLS (or the detected result ISTEP) with the stored first reference value and output the first control signal CS1 according to the comparison result. The first switch SW1 may be turned off according to the first control signal CS1. In other words, the first switch SW1 may be turned on or turned off according to the dimming level of the lighting 100.

As shown in FIG. 5A, when the first control signal CS1 is not output, the first switch SW1 is in the turned-on state. At this time, the smoothing capacitor Cs and the first capacitor C1 are connected in parallel.

As shown in FIG. 5B, when the first control signal CS1 is output, the first switch SW1 is turned off. Therefore, since the first capacitor C1 connected in parallel with the smoothing capacitor Cs is disconnected, the combined capacitance of the full-wave rectifier circuit 123 is reduced. Therefore, the THD of the converter 120 for the lighting control device can be reduced.

In other words, according to the embodiments of the present disclosure, when the dimming level of the lighting 100 is smaller than the first reference value, the combined capacitance of the full-wave rectifier circuit 123 is reduced, and thus it is possible to reduce (i.e., improve) the THD of the converter 120 for the lighting control device.

FIG. 6 is a view showing an effect of improving total harmonic distortion (THD) according to the operation of the full-wave rectifier circuit according to the embodiments of the present disclosure. Referring to FIG. 6, CASE1 represents the THD of the converter 120 for the lighting control device when the combined capacitance of the full-wave rectifier circuit 123 is not changed, and CASE2 represents the THD of the converter 120 for the lighting control device when the combined capacitance of the full-wave rectifier circuit 123 is changed according to the dimming level according to the embodiments of the present disclosure.

Referring to CASE1, the THD of the converter 120 for the lighting control device may increase as the dimming level decreases, and in particular, there may occur a problem that the THD of the converter 120 for the lighting control device exceeds an allowable value in a range where the dimming level is smaller than the first reference value. In other words, when the dimming level of the lighting 100 is smaller than a predetermined reference (e.g., the first reference value), there is a problem that the THD of the converter 120 for the lighting control device exceeds the allowable value.

Referring to CASE2, when the dimming level is smaller than the first reference value, the first control signal CS1 is output from the dimming control circuit 129, and the first switch SW1 is turned off in response to the first control signal CS1, and thus the combined capacitance of the full-wave rectifier circuit 123 is reduced. Therefore, it is possible to reduce the THD of the converter 120 for the lighting control device.

In other words, the converter 120 for the lighting control device according to the embodiments of the present disclosure can change (i.e., reduce) the combined capacitance of the full-wave rectifier circuit 123 according to the dimming level of the lighting 100, thereby reducing the THD of the converter 120 for the lighting control device. In particular, the converter 120 for the lighting control device according to the embodiments of the present disclosure can prevent the THD from exceeding the allowable value by reducing the combined capacitance of the full-wave rectifier circuit 123 when the dimming level of the lighting 100 is smaller than or equal to the first reference value.

FIG. 7 shows the filter circuit according to the embodiments of the present disclosure. Referring to FIG. 7, the filter circuit 121 may include a first filter circuit 121a and a second filter circuit 121b.

When the combined capacitance of the filter circuit 121 increases, it is possible to reduce (i.e., improve) the EMI of the converter 120 for the lighting control device. As will be described below, the converter 120 for the lighting control device according to the embodiments of the present disclosure may change the combined capacitance of the filter circuit 121 according to the dimming level of the lighting 100, thereby improving the EMI of the converter 120 for the lighting control device according to the dimming level.

The first filter circuit 121a may be configured to remove the radiated noise component included in the input power VIN. According to the embodiments, the first filter circuit 121a may include a first line filter LF1 configured to remove high-frequency noise and a first filter capacitor Cf1 connected to a rear end of the first line filter LF1.

In addition, the first filter circuit 121a may include a second capacitor C2 selectively connected in parallel to the first filter capacitor Cf1 in response to the second control signal CS2. Therefore, the combined capacitance of the first filter circuit 121a may be changed.

According to the embodiments, a stabilization circuit including a fuse for blocking an overcurrent or a varistor for blocking an input overvoltage and a discharge capacitor may be connected between the first line filter LF1 and the first filter capacitor Cf1.

The second filter circuit 121b may be configured to remove the conductive noise component included in the input power VIN. According to the embodiments, the second filter circuit 121b may include a second line filter LF2 configured to remove low-frequency noise, discharge capacitors SP1 and SP2 connected between the line filter LF2, a second filter capacitor Cf2 connected to the rear end of the second line filter LF2, and discharge resistors R1 to R3.

According to the embodiments, the first line filter LF1 may be configured to remove noise in a high frequency (e.g., 30 MHz or higher) band, and the second line filter LF2 may be configured to remove noise in a low frequency (e.g., lower than 1 MHz) band. For example, the number of turns (per unit length) of the inductor included in the first line filter LF1 may be smaller than the number of turns (per unit length) of the inductor included in the second line filter LF2.

The combined capacitance of the filter circuit 121 according to the embodiments of the present disclosure may be increased in response to the second control signal CS2.

According to the embodiments, the combined capacitance of the first filter circuit 121a may be increased in response to the second control signal CS2.

According to the embodiments, the first filter circuit 121a may include a plurality of capacitors arranged in a third array, and the array of the plurality of capacitors may be changed from the third array to a fourth array in response to the second control signal CS2. In this case, a capacitance in the fourth array of the first filter circuit 121a may be greater than a capacitance in the third array.

For example, the first filter circuit 121a may include a second switch SW2 connected to the second capacitor C2 and operating in response to the second control signal CS2. As the second switch SW2 is turned on and turned off, whether the first filter capacitor Cf1 and the second capacitor C2 are connected in parallel may be determined, and thus the combined capacitance of the first filter circuit 121a may be changed.

For example, as shown in FIG. 7, one end of the first filter capacitor Cf1 may be connected to one end of the second capacitor C2, the other end of the first filter capacitor Cf1 may be connected to one end of the second switch SW2, and the other end of the second capacitor C2 may be connected to the other end of the second switch SW2. At this time, when the second switch SW2 is turned on in response to the second control signal CS2, the second capacitor C2 is connected in parallel to the first filter capacitor Cf1, and thus the combined capacitance of the filter circuit 121 increases.

In the specification, the embodiment in which the first filter circuit 121a further includes the second capacitor C2 connected in parallel to the first filter capacitor Cf1 in response to the second control signal CS2 is described, but according to the embodiments, the first filter capacitor Cf1 may be implemented as a variable capacitor whose capacitance is changed in response to the second control signal CS2.

According to the embodiments, the second control signal CS2 may be output based on the dimming level of the lighting 100. For example, the second control signal CS2 may be output when the dimming level of the lighting 100 is greater than the second reference value. In this case, the second reference value which is the output reference of the second control signal CS2 may be greater than the first reference value which is the output reference of the first control signal CS1.

FIG. 8 shows an operation of the filter circuit according to the embodiments of the present disclosure. FIG. 8A shows the filter circuit 121 in which the second switch SW2 is turned off, and FIG. 8B shows the filter circuit 121 in which the second switch SW2 is turned on.

The dimming control circuit 129 may compare the magnitude of the dimming level signal DLS (or the detected result ISTEP) with the stored second reference value and output the second control signal CS2 according to the comparison result. The second switch SW2 may be turned on in response to the second control signal CS2. In other words, the second switch SW2 may be turned on or turned off according to the dimming level of the lighting 100.

As shown in FIG. 8A, when the second control signal CS2 is not output, the second switch SW2 is turned off. At this time, the first filter capacitor Cf1 and the second capacitor C2 are not connected.

As shown in FIG. 8B, when the second control signal CS2 is output, the second switch SW2 is turned on. Therefore, since the first filter capacitor Cf1 and the second capacitor C2 are connected in parallel to each other, the combined capacitance of the filter circuit 121 increases. Therefore, it is possible to reduce the EMI of the converter 120 for the lighting control device.

In other words, according to the embodiments of the present disclosure, when the dimming level of the lighting 100 exceeds the second reference value, the combined capacitance of the filter circuit 121 can be increased, thereby reducing (i.e., improve) the EMI of the converter 120 for the lighting control device.

FIGS. 9 and 10 are views showing an effect of improving electromagnetic interference (EMI) according to the operation of the filter circuit according to the embodiments of the present disclosure. FIG. 9 shows the EMI of the converter 120 for the lighting control device when the combined capacitance of the filter circuit 121 is not changed, and FIG. 10 shows the EMI of the converter 120 for the lighting control device when the combined capacitance of the filter circuit 121 is changed according to the embodiments of the present disclosure.

Referring to FIG. 9, there may be a section in which a quasi peak of the EMI of the converter 120 for the lighting control device exceeds an allowable value. According to the embodiments, as the dimming level of the lighting 100 increases, the EMI of the converter 120 for the lighting control device may increase. In particular, when the dimming level exceeds the second reference value, there may be a section in which the quasi peak of the EMI of the converter 120 for the lighting control device exceeds the allowable value.

Referring to FIG. 10, when the dimming level exceeds the second reference value, the second control signal CS2 is output from the dimming control circuit 129, and the second switch SW2 is turned on in response to the second control signal CS2, and thus the combined capacitance of the filter circuit 121 increases. Therefore, it is possible to reduce the EMI of the converter 120 for the lighting control device. As shown in FIG. 10, it can be confirmed that the existing quasi peak having exceeded the allowable value is no longer present.

In other words, the converter 120 for the lighting control device according to the embodiments of the present disclosure can change (i.e., increase) the combined capacitance of the filter circuit 121 according to the dimming level of the lighting 100, thereby reducing the EMI of the converter 120 for the lighting control device. In particular, the converter 120 for the lighting control device according to the embodiments of the present disclosure can prevent the EMI from exceeding the allowable value by increasing the combined capacitance of the filter circuit 121 when the dimming level of the lighting 100 exceeds the second reference value.

FIG. 11 shows an operation of the converter according to the embodiments of the present disclosure. FIG. 11 shows a change in capacitance of each of the full-wave rectifier circuit 123 and the filter circuit 121 according to the dimming level DL of the lighting 100. Here, the second reference value may be a value greater than the first reference value.

According to the embodiments of the present disclosure, when the dimming level of the lighting 100 is smaller than the first reference value, the capacitance of the full-wave rectifier circuit 123 may be reduced. According to the embodiments, the dimming control circuit 129 may compare the dimming level of the lighting 100 with the first reference value previously stored and output the first control signal CS1 instructing a decrease in the capacitance of the full-wave rectifier circuit 123 when the dimming level is smaller than the first reference value.

For example, as described with reference to FIGS. 4 to 6, when the dimming level is smaller than the first reference value, the dimming control circuit 129 may output the first control signal CS1 to the full-wave rectifier circuit 123, and the first capacitor C1 connected in parallel to the smoothing capacitor Cs is disconnected in response to the first control signal CS1. Therefore, the capacitance of the full-wave rectifier circuit 123 may be reduced, and as a result, it is possible to reduce the THD of the converter 120 for the lighting control device.

In addition, according to the embodiments of the present disclosure, when the dimming level of the lighting 100 exceeds the second reference value, the capacitance of the filter circuit 121 may be increased. According to the embodiments, the dimming control circuit 129 may compare the dimming level of the lighting 100 with the second reference value previously stored and output the second control signal CS2 instructing an increase in the capacitance of the filter circuit 121 when the dimming level exceeds the second reference value.

For example, as described with reference to FIGS. 7 to 10, when the dimming level exceeds the second reference value, the dimming control circuit 129 may output the second control signal CS2 to the filter circuit 121, and the second capacitor C2 is connected in parallel to the first filter capacitor Cf1 in response to the second control signal CS2. Therefore, the capacitance of the filter circuit 121 may be increased, and as a result, it is possible to reduce the EMI of the converter 120 for the lighting control device.

In other words, the converter 120 for the lighting control device according to the embodiments of the present disclosure can improve the THD or EMI of the converter 120 for the lighting control device by changing (increasing or decreasing) the capacitance of the filter circuit 121 or the full-wave rectifier circuit 123 according to the dimming level of the lighting 100.

FIG. 12 is a flowchart showing a method of operating the converter according to the embodiments of the present disclosure. Referring to FIG. 12, the converter 120 for the lighting control device may compare the dimming level of the lighting with the stored reference values (S110). According to the embodiments, the dimming control circuit 129 may compare the dimming level of the lighting 100 with the second reference value and first reference value previously stored.

For example, the dimming control circuit 129 may compare the dimming level with the stored reference values using the dimming control signal DCS transmitted from the control modem 110. The dimming control signal DCS transmitted from the control modem 110 includes information on the dimming level of the lighting 100.

In addition, for example, the dimming control circuit 129 may compare the dimming level with the stored reference values using the detected result ISTEP output from the output circuit 127. The detected result ISTEP may be associated with the magnitude of the driving power IOUT, and the driving power IOUT transmitted to the lamp module 130 may be associated with the dimming level of the lighting 100.

As the comparison result, when the dimming level is smaller than the first reference value (Y in S120), the converter 120 for the lighting control device may reduce the capacitance of the full-wave rectifier circuit 123 (S130). According to the embodiments, the dimming control circuit 129 may output the first control signal CS1 for reducing the capacitance of the full-wave rectifier circuit 123 to the full-wave rectifier circuit 123 when the dimming level is smaller than the first reference value.

As the comparison result, when the dimming level exceeds the second reference value greater than the first reference value (Y in S140), the converter 120 for the lighting control device may increase the capacitance of the filter circuit 121 (S150). According to the embodiments, the dimming control circuit 129 may output the second control signal CS2 for increasing the capacitance of the filter circuit 121 to the filter circuit 121 when the dimming level exceeds the second reference value.

The converter 120 for the lighting control device according to the embodiments of the present disclosure can improve the THD or EMI of the converter 120 for the lighting control device by changing (increasing or decreasing) the capacitance of the filter circuit 121 or the full-wave rectifier circuit 123 according to the dimming level of the lighting 100.

Therefore, the lighting 100 including the converter 120 for the lighting control device according to the embodiments of the present disclosure may have improved THD and EMI and in particular, have adjustable THD and EMI for each dimming level, thereby complying with the allowable value suitable for each dimming level.

Meanwhile, FIG. 12 shows that the operation S140 is performed after the operation S120, but according to the embodiments, the operation S120 may be performed after the operation S140 or the operations S120 and S140 may also be performed in parallel.

Although the embodiments have been described above with reference to the limited embodiments and the drawings, various modifications and variations are possible by those skilled in the art from the above description. For example, the appropriate results can be achieved even when the described techniques are performed in a different order from the described method and/or the described components of the system, structure, apparatus, circuit, and the like are coupled or combined in a different form from the described method or replaced or substituted with other components or equivalents.

Therefore, other implementations, other embodiments, and equivalents to the claims are also within the scope of the appended claims.

INDUSTRIAL APPLICABILITY

The present disclosure relates to a converter and a lighting control device including the same.

The invention claimed is:

1. A converter for a lighting control device comprising:
a filter circuit configured to remove a noise component included in input power;
a full-wave rectifier circuit configured to generate a direct current (DC) constant voltage from the input power with the noise component removed;
a power conversion circuit configured to generate driving power of a lighting using the DC constant voltage; and
a dimming control circuit configured to output a dimming control signal for adjusting the driving power to the power conversion circuit according to a dimming level indicating a brightness of the lighting,
wherein the dimming control circuit outputs a first control signal to the full-wave rectifier circuit when the dimming level is smaller than a first reference value, and
a combined capacitance of the full-wave rectifier circuit is reduced in response to the first control signal, thereby reducing total harmonic distortion (THD) of the converter for the lighting control device,
wherein the full-wave rectifier circuit includes:
a rectifying circuit; and
a smoothing circuit includes a plurality of capacitors,
wherein the plurality of capacitors are configured to be arranged in a first array having a first capacitance,
wherein the plurality of capacitors are configured to be arranged in a second array having a second capacitance smaller than the first capacitance from the first array in response to the first control signal when the dimming level is less than the first reference value.

2. The converter for the lighting control device of claim 1,
wherein the dimming control circuit outputs a second control signal to the filter circuit when the dimming level exceeds a second reference value greater than the first reference value, and
a combined capacitance of the filter circuit is increased in response to the second control signal, thereby reducing electromagnetic interference (EMI) of the converter for the lighting control device.

3. The converter for the lighting control device of claim 2, wherein the dimming control circuit includes an integrated circuit having an arithmetic processing function, and
the integrated circuit compares the dimming level with a first reference value previously stored and outputs the first control signal to the full-wave rectifier circuit when the dimming level is smaller than the first reference value, and
compares the dimming level with a second reference value previously stored and outputs the second control signal to the filter circuit when the dimming level exceeds the second reference value.

4. The converter for the lighting control device of claim 1, wherein the dimming control circuit determines the dimming level by a dimming level signal transmitted to the converter for the lighting control device or the driving power.

5. The converter for the lighting control device of claim 1, wherein the smoothing circuit includes:
a smoothing capacitor configured to smooth the ripple power;
a first capacitor connected to one end of the smoothing capacitor; and
a first switch connected to the other end of the first capacitor and connected to the other end of the smoothing capacitor, and
the first switch is turned off in response to the first control signal.

6. The converter for the lighting control device of claim 2, wherein the filter circuit includes:
a first filter circuit configured to remove high-frequency noise of the input power; and
a second filter circuit configured to remove low-frequency noise of the input power,
the first filter circuit includes a plurality of capacitors,
the arrangement of the plurality of capacitors is changed from a third array to a fourth array in response to the second control signal, and
a capacitance in the fourth array of the first filter circuit is greater than a capacitance in the third array.

7. The converter for the lighting control device of claim 6, wherein the first filter circuit includes:
a first line filter configured to remove high-frequency noise of the input power;
a first filter capacitor connected to the first line filter;

a second capacitor connected to one end of the first filter capacitor; and a second switch connected to the other end of the second capacitor and connected to the other end of the first filter capacitor, and the second switch is turned on in response to the second control signal.

8. The converter for the lighting control device of claim 6, wherein the first filter circuit includes a first line filter including a first inductor, the second filter circuit includes a second line filter including a second inductor, and the number of turns of the first inductor is smaller than the number of turns of the second inductor.

9. The converter for the lighting control device of claim 7, the first filter circuit further includes a stabilization circuit including a blocking element disposed between the first line filter and the first filter capacitor and configured to block overpower.

10. The converter for the lighting control device of claim 1, wherein the dimming control circuit includes a first light emitting element configured to output the first control signal in the form of an optical signal, and the full-wave rectifier circuit includes a first light receiving element configured to receive the first control signal output from the first light emitting element and reduce the combined capacitance of the full-wave rectifier circuit in response to the first control signal.

11. A lighting control device included in a lighting and configured to control the lighting, the lighting control device comprising:

a control modem configured to receive alternating current (AC)-typed input power from an external controller; and a converter for a lighting control device configured to generate a direct current (DC)-typed driving power using the AC-typed input power, wherein the control modem outputs a dimming level signal representing a dimming level associated with a brightness of the lighting to the converter for the lighting control device, and the converter for the lighting control device adjusts a magnitude of the driving power based on the dimming level signal, changes a combined capacitance of the converter for the lighting control device to a first capacitance when the dimming level is smaller than a first reference value, changes the combined capacitance of the converter for the lighting control device to a second capacitance greater than the first capacitance when the dimming level is greater than or equal to the first reference value, and changes the combined capacitance of the converter for the lighting control device to a third capacitance greater than the second capacitance when the dimming level exceeds a second reference value greater than the first reference value.

12. A converter for a lighting control device comprising:

a filter circuit configured to remove a noise component included in input power;

a full-wave rectifier circuit configured to generate a direct current (DC) constant voltage from the input power with the noise component removed;

a power conversion circuit configured to generate driving power of a lighting using the DC constant voltage; and a dimming control circuit configured to output a control signal for adjusting the driving power to the filter circuit according to a dimming level indicating a brightness of the lighting, wherein the dimming control circuit outputs the control signal to the filter circuit when the dimming level exceeds a reference value, and a combined capacitance of the filter circuit is increased in response to the control signal, thereby reducing electromagnetic interference (EMI) of the converter for the lighting control device.

* * * * *